United States Patent
Xue

(10) Patent No.: US 10,891,944 B2
(45) Date of Patent: Jan. 12, 2021

(54) ADAPTIVE AND COMPENSATORY SPEECH RECOGNITION METHODS AND DEVICES

(71) Applicant: Alibaba Group Holding Limited, Grand Cayman (KY)

(72) Inventor: Shaofei Xue, Hangzhou (CN)

(73) Assignee: Alibaba Group Holding Limited

(*) Notice: Subject to any disclaimer, the term of this patent is extended or adjusted under 35 U.S.C. 154(b) by 0 days.

(21) Appl. No.: 15/638,157

(22) Filed: Jun. 29, 2017

(65) Prior Publication Data
US 2018/0005628 A1   Jan. 4, 2018

(30) Foreign Application Priority Data
Jun. 30, 2016 (CN) .......................... 2016 1 0509783

(51) Int. Cl.
| | |
|---|---|
| *G10L 15/00* | (2013.01) |
| *G10L 15/26* | (2006.01) |
| *G10L 21/00* | (2013.01) |
| *G10L 25/00* | (2013.01) |
| *G10L 15/18* | (2013.01) |
| *G10L 15/02* | (2006.01) |
| *G10L 15/06* | (2013.01) |

(Continued)

(52) U.S. Cl.
CPC .............. *G10L 15/18* (2013.01); *G06F 40/00* (2020.01); *G06F 40/20* (2020.01); *G10L 15/02* (2013.01); *G10L 15/063* (2013.01); *G10L 15/08* (2013.01); *G10L 15/197* (2013.01)

(58) Field of Classification Search
CPC ..... G10L 15/063; G10L 15/02; G10L 15/065; G10L 17/005; G10L 15/22; G10L 15/25; G10L 15/01; G10L 17/04

USPC .......................................... 704/231, 235, 246
See application file for complete search history.

(56) References Cited

U.S. PATENT DOCUMENTS 5,664,059 A * 9/1997 Zhao ....................... G10L 15/07
                                                             704/254
5,793,891 A * 8/1998 Takahashi ............. G10L 15/065
                                                             382/228

(Continued)

FOREIGN PATENT DOCUMENTS

| CN | 101510424 A | 8/2009 |
|---|---|---|
| CN | 101515456 A | 8/2009 |

(Continued)

OTHER PUBLICATIONS

Garcia-Romero et al, "Improving speaker recognition performance in the domain adaptation challenge using deep neural networks," 2014 IEEE Spoken Language Technology Workshop (SLT), South Lake Tahoe, NV, 2014, pp. 378-383.*

(Continued)

*Primary Examiner* — Olujimi A Adesanya
(74) *Attorney, Agent, or Firm* — Lee & Hayes, P.C.

(57) ABSTRACT

A speech recognition method includes clustering feature vectors of training data to obtain clustered feature vectors of training data performing interpolation calculation on feature vectors of data to be recognized using the clustered feature vectors of training data, and inputting the feature vectors of data to be recognized after the interpolation calculation into a speech recognition model to adaptively adjust the speech recognition model. The techniques of the present disclosure improve speech recognition accuracy and adaptive processing efficiency.

20 Claims, 3 Drawing Sheets

(51) Int. Cl.
*G06F 40/00* (2020.01)
*G06F 40/20* (2020.01)
*G10L 15/08* (2006.01)
*G10L 15/197* (2013.01)

(56) References Cited

U.S. PATENT DOCUMENTS

| | | | | |
|---|---|---|---|---|
| 5,864,810 | A * | 1/1999 | Digalakis | G10L 15/07 704/254 |
| 5,895,447 | A | 4/1999 | Ittycheriah et al. | |
| 5,895,477 | A | 4/1999 | Orr et al. | |
| 6,073,096 | A * | 6/2000 | Gao | G10L 15/07 704/245 |
| 6,076,057 | A * | 6/2000 | Narayanan | G10L 15/07 704/233 |
| 6,100,901 | A * | 8/2000 | Mohda | G06K 9/6218 345/440 |
| 6,236,963 | B1 * | 5/2001 | Naito | G10L 15/07 704/234 |
| 6,766,295 | B1 * | 7/2004 | Murveit | G10L 15/30 379/88.01 |
| 7,574,359 | B2 * | 8/2009 | Huang | G10L 15/07 704/244 |
| 9,378,742 | B2 * | 6/2016 | Kim | G10L 15/32 |
| 2002/0055840 | A1 | 5/2002 | Yamada et al. | |
| 2003/0120488 | A1 * | 6/2003 | Yoshizawa | G10L 15/065 704/233 |
| 2004/0093210 | A1 * | 5/2004 | Toyama | G10L 15/07 704/233 |
| 2004/0260550 | A1 * | 12/2004 | Burges | G10L 17/00 704/259 |
| 2005/0182626 | A1 * | 8/2005 | Kim | G10L 15/07 704/245 |
| 2006/0074657 | A1 * | 4/2006 | Huang | G10L 15/07 704/246 |
| 2006/0195317 | A1 * | 8/2006 | Graciarena | G10L 15/20 704/233 |
| 2007/0219798 | A1 | 9/2007 | Wang et al. | |
| 2009/0083023 | A1 * | 3/2009 | Foster | G06F 40/45 704/3 |
| 2010/0198598 | A1 * | 8/2010 | Herbig | G10L 15/07 704/240 |
| 2010/0318354 | A1 | 12/2010 | Seltzer et al. | |
| 2011/0311144 | A1 | 12/2011 | Tardif | |
| 2012/0232902 | A1 * | 9/2012 | Bocchieri | G10L 15/063 704/243 |
| 2013/0191126 | A1 | 7/2013 | Thambiratnam et al. | |
| 2013/0300939 | A1 * | 11/2013 | Chou | G06K 9/00765 348/700 |
| 2014/0214420 | A1 * | 7/2014 | Yao | G10L 15/063 704/243 |
| 2015/0199960 | A1 * | 7/2015 | Huo | G10L 15/063 704/245 |
| 2016/0336006 | A1 * | 11/2016 | Levit | G10L 15/10 |
| 2016/0358599 | A1 * | 12/2016 | Wang | G10L 15/063 |
| 2017/0206894 | A1 | 7/2017 | Kang et al. | |

FOREIGN PATENT DOCUMENTS

| | | |
|---|---|---|
| CN | 102270451 A | 12/2011 |
| CN | 102314595 A | 1/2012 |
| CN | 103219008 A | 7/2013 |
| CN | 104572631 A | 4/2015 |
| JP | 2888781 B2 | 5/1999 |

OTHER PUBLICATIONS

Garcia-Romero et al, "Supervised domain adaptation for i-vector based speaker recognition." 2014 IEEE International Conference on Acoustics, Speech and Signal Processing (ICASSP). IEEE, 2014, pp. 4047-4051.*

Shum et a;, "Unsupervised clustering approaches for domain adaptation in speaker recognition systems,", 2014, in Proc. IEEE Odyssey, 2014, pp. 265-272.*

Garcia-Romero et al, "Analysis of i-vector length normalization in speaker recognition systems." 2011, Twelfth Annual Conference of the International Speech Communication Association. 2011, pp. 1-4.*

Yoshizawa et al, "Unsupervised speaker adaptation based on sufficient HMM statistics of selected speakers.", 2001. IEEE International Conference on Acoustics, Speech, and Signal Processing. Proceedings (Cat. No. 01CH37221). vol. 1. IEEE, 2001, pp. 341= 344.*

Zajic et al, "Initialization of fMLLR with sufficient statistics from similar speakers.", 2011, International Conference on Text, Speech and Dialogue. Springer, Berlin, Heidelberg, 2011, pp. 187-194.*

Li et al, "Incremental on-line feature space MLLR adaptation for telephony speech recognition.", 2002, Seventh International Conference on Spoken Language Processing. 2002. pp. 1-4.*

Nguyen DH, Xiao X, Chng ES, Li H. Feature adaptation using linear spectro-temporal transform for robust speech recognition, Jan. 27, 2016, IEEE/ACM Transactions on Audio, Speech, and Language Processing. Jan. 27, 2016;24(6):1006-19.*

Tang et al, "Partially supervised speaker clustering", 2011, IEEE transactions on pattern analysis and machine intelligence. Aug. 18, 2011;34(5):959-71.*

Cerva et al, "Speaker-adaptive speech recognition using speaker diarization for improved transcription of large spoken archives", 2013, Speech Communication. Nov. 1, 2013;55(10):1033-46.*

PCT Search Report and Written Opinion dated Sep. 22, 2017 for PCT Application No. PCT/US17/40090, 8 Pages.

Wan et al. "Cluster Adaptive Training of Average Voice Models." In: Acoustics, 1-20, Speech and Signal Processing (ICASSP), 2014 IEEE International Conference on, May 4-9, 2014 [online] [retrieved on Sep. 1, 2017 (Sep. 1, 2017)] Retrieved from the Internet <URL:http:/lieeexplore.ieee.org/abstract/document/6853602/>, 5 pages.

English translated Chinese First Office Action dated Feb. 27, 2020 for Chinese Patent Application No. 201610509783.5, a counterpart foreign application of U.S. Appl. No. 15/638,157, 16 pages.

The Extended European Search Report dated Jan. 20, 2020 for European Patent Application No. 17821286.6, 8 pages.

English translated First Chinese Search Report dated Feb. 18, 2020, for Chinese Patent Application No. 2016105097835, 2 pages.

* cited by examiner

ADAPTIVE AND COMPENSATORY SPEECH RECOGNITION METHODS AND DEVICES

CROSS REFERENCE TO RELATED PATENT APPLICATIONS

This application claims priority to Chinese Patent Application No. 201610509783.5, filed on Jun. 30, 2016, entitled "Method of speech recognition and device thereof," which is hereby incorporated by reference in its entirety.

TECHNICAL FIELD

The present disclosure relates to the field of speech recognition, and, more particularly, to a method and device for speech recognition.

BACKGROUND

Speech recognition technology, also called Automatic Speech Recognition (ASR), converts the contents of the human voice as a computer-readable input such as a key or a binary coded character sequence. Speech recognition is an interdisciplinary, which includes fields such as signal processing, pattern recognition, probability theory and information theory, vocal mechanism and auditory mechanisms, artificial intelligence, and so on. In recent years, speech recognition technology has made significant progress, starting from the lab to the marketplace. Speech recognition technology is entering all areas of industry, home appliances, communications, automotive electronics, medical, family services, and consumer electronics products.

A speech recognition acoustic model is an important technique to improve the accuracy of speech recognition. The speech recognition acoustic model has important applications in personalized speech recognition and other fields. The speech recognition acoustic model usually uses adaptive data to modify the original acoustic model to improve the performance to a certain degree. Adaptive methods based on feature vectors become more and more popular, and feature vectors (e.g., i-Vector) may be input to the acoustic model as compensation to improve the accuracy of speech recognition. In the conventional techniques, a large amount of training date is required to obtain feature vectors having good performance. When the training data is limited, estimated voiceprint feature vectors may not improve speech recognition effectively. However, for some application scenarios for speech recognition, users often give a short speech (e.g., searching hotels nearby). This demands more from adaptive speech recognition.

SUMMARY

Example embodiments of the present disclosure relate to a method of speech recognition and device thereof, and to improving speech recognition accuracy and adaptive processing efficiency. This Summary is not intended to identify all key features or essential features of the claimed subject matter, nor is it intended to be used alone as an aid in determining the scope of the claimed subject matter.

An example embodiment of the present disclosure provides a method of speech recognition.

An audio capturing device records audios, such as a few sentences narrated by a user, as training data. Alternatively, the audio capturing device may receive the audios as the training data from another computing device. For example, the audio capturing device may be part of a device for speech recognition, such as a microphone, a speaker on a mobile device. For another example, the audio capturing device may be a computing device separate from the device for speech recognition, such as a voice recorder. The device for speech recognition may apply all steps of the following method of speed recognition, transmit the training data to one or more servers for speech recognition in a distributive environment, or request the one or more servers for speech recognition to perform some steps of the following method.

The method may include clustering feature vectors of training data to obtain clustered feature vectors of training data, performing interpolation calculation on feature vectors of data to be recognized using the clustered feature vectors of training data, and inputting the feature vectors of data to be recognized after the interpolation calculation into a speech recognition model to adaptively adjust the speech recognition model.

In implementations, the method may include performing adaptive training on the speech recognition model using the clustered feature vectors of training data to obtain the speech recognition model after obtaining the clustered feature vectors of training data.

In implementations, the method may include performing weight average processing on clustered feature vectors of training data that belong to a cluster after clustering feature vectors of training data and before obtaining the clustered feature vectors of training data.

In implementations, the performing interpolation calculation on feature vectors of data to be recognized using the clustered feature vectors of training data may be implemented by calculating a cosine distance between the feature vectors of data to be recognized and the clustered feature vectors of training data and performing interpolation calculation on feature vectors of data to be recognized using a predetermined number of clustered feature vectors of training data of which cosine distances are greater than a value.

In implementations, the method may further include configuring adjustable parameters of interpolation during the interpolation calculation and configuring a degree of influence of the clustered feature vectors of training data to the feature vectors of data to be recognized by adjusting values of the adjustable parameters.

In implementations, the feature vectors of training data include at least one of a voiceprint feature vector, a noise feature vector, a dialect feature vector, or a scene information feature vector.

Another example embodiment of the present disclosure provides a device for speech recognition.

An audio capturing device records audios, such as a few sentences narrated by a user, as training data. Alternatively, the audio capturing device may receive the audios as the training data from another computing device. For example, the audio capturing device may be part of the device for speech recognition, such as a microphone, a speaker on a mobile device. For another example, the audio capturing device may be a computing device separate from the device for speech recognition, such as a voice recorder. The device for speech recognition may perform the speed recognition alone, transmit the training data to one or more servicer for speech recognition in a distribution environment, or request the one or more servers for some steps of the speech recognition.

For example, the device may include a clustering module configured to cluster feature vectors of training data to obtain clustered feature vectors of training data, an interpolation module configured to perform interpolation calculation on feature vectors of data to be recognized using the clustered feature vectors of training data, and an adaptive adjustment module configured to input the feature vectors of data to be recognized after the interpolation calculation into a speech recognition model to adjust the speech recognition model adaptively.

In implementations, the device may further include a model adaptive module configured to perform adaptive training on the speech recognition model using the clustered feature vectors of training data to obtain the speech recognition model.

In implementations, the device may further include a weighting module configured to perform weight average processing on clustered feature vectors of training data that belong to a cluster.

In implementations, the interpolation module may be configured to further calculate a cosine distance between the feature vectors of data to be recognized and the clustered feature vectors of training data and perform interpolation calculation on feature vectors of data to be recognized using a predetermined number of clustered feature vectors of training data of which cosine distances are greater than a value.

In implementations, the interpolation module may be configured to configure adjustable parameters of interpolation and configure a degree of influence of the clustered feature vectors of training data to the feature vectors of data to be recognized by adjusting values of the adjustable parameters.

In implementations, the feature vectors of training data may include at least one of a voiceprint feature vector, a noise feature vector, a dialect feature vector, or a scene information feature vector.

Another example embodiment of the present disclosure provides one or more memories stored thereon computer-readable instructions that, when executed by the one or more processors, cause the one or more processors to perform acts comprising:

clustering, by one or more processors of a computing device, feature vectors of training data to obtain clustered feature vectors of training data;

performing interpolation calculation on feature vectors of data to be recognized using the clustered feature vectors of training data; and inputting the feature vectors of data to be recognized into a speech recognition model to adaptively adjust the speech recognition model.

For example, the acts further comprise:
performing adaptive training of the speech recognition model using the clustered feature vectors of training data to obtain the speech recognition model after obtaining the clustered feature vectors of training data.

For example, the acts further comprise:
after clustering the feature vectors of training data and before obtaining the clustered feature vectors of training data,
performing weight average processing on clustered feature vectors of training data that belong to a cluster.

For example, the performing interpolation calculation on the feature vectors of data to be recognized using the clustered feature vectors of training data includes:

calculating a cosine distance between the feature vectors of data to be recognized and the clustered feature vectors of training data; and performing interpolation calculation on the feature vectors of data to be recognized using a predetermined number of clustered feature vectors of training data of which cosine distances are greater than a preset value.

For example, the acts further comprise:
configuring adjustable parameters of interpolation during the interpolation calculation; and
configuring a degree of influence of the clustered feature vectors of training data on the feature vectors of data to be recognized by adjusting values of the adjustable parameters.

With respect to the conventional speech recognition techniques and particularly to adaptive speech recognition techniques, the example embodiments of the present disclosure cluster the feature vectors of the training data to reduce the number of feature vectors of the training data and improve accuracy during the training stage. Further, when the clustered feature vectors of training data are used to establish models, vector dimensions are reduced. Thus, the complexity of the models is reduced. Further, the example embodiments of the present disclosure perform interpolation calculation on feature vectors of data to be recognized using the clustered feature vectors of training data during a recognition stage. Because the amount of training data is relatively large, the accuracy is high. Accordingly, the example embodiments of the present disclosure are particularly suitable for speech recognition of a small amount of data to be recognized (e.g., short voice clips provided by users). By compensating the data to be recognized using the training data that is relatively more accurate, more accurate results of speech recognition may be obtained. Further, because the complexity of the models is reduced, efficiency may be improved during the recognition stage.

Those skilled in the art will appreciate that the present disclosure is not limited to these example embodiments although the following detailed descriptions are provided with reference to the illustrated example embodiments and the accompanying drawings. Further, the scope of the present disclosure is extensive, and the appended claims are intended to define the scope of the present disclosure.

BRIEF DESCRIPTION OF THE DRAWINGS

The Detailed Description is described with reference to the accompanying figures. The use of the same reference numbers in different figures indicates similar or identical items.

Figure 1:
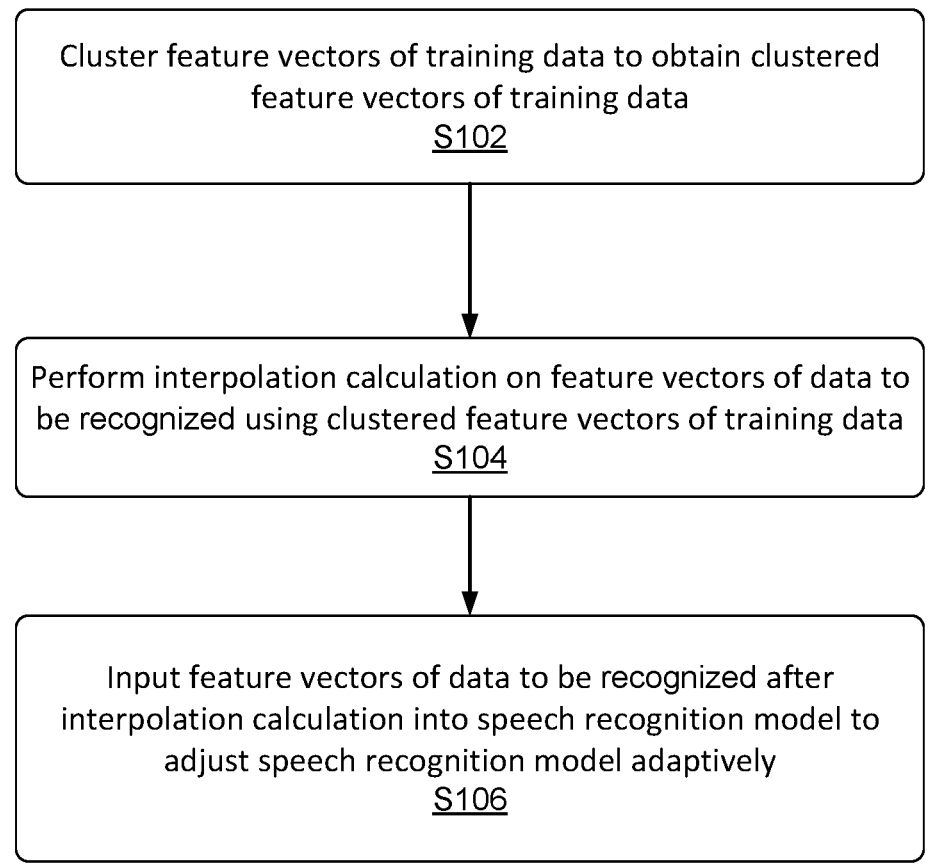
FIG. 1 is a flowchart illustrating an example method of speech recognition in accordance with example embodiments of the present disclosure.

Those skilled in the art will appreciate that the present disclosure is not limited to these example embodiments, although the following detailed descriptions are provided with reference to the illustrated example embodiments and the accompanying drawings. Further, the scope of the present disclosure is extensive, and the claims are intended to define the scope of the present disclosure.

DETAILED DESCRIPTION

It should be noted that some exemplary example embodiments are described as a method or process in the form of a flowchart. Although the flowchart is described as a sequential process, many operations may be performed in parallel, concurrently or simultaneously. In addition, the order of the operations may be rearranged. When the operation is terminated, there may be additional operations that are not included in the drawings. The process may correspond to a method, a function, procedure, a subroutine, a subprogram and so on.

The computer device includes a user equipment and network equipment. The user equipment includes, but not limited to, computers, smart phones, PDA, etc. The network device may include but not limited to a computer, a network host, a single network server, multi-server cluster, or a cloud including multiple servers. Cloud computing is a distributed computing and includes a virtual supercomputer having a group of loosely coupled computer set. The example embodiments of the present disclosure may be implemented by a computing device and/or other computing devices via the network. The computer network device is located but not limited to the Internet, WAN, MAN, LAN, VPN networks.

It should be noted that the user equipment, network equipment, and networks are of example only, and other existing or possible future device as applicable to the present disclosure are also within the scope of protection of the present disclosure and are incorporated herein by reference.

The method discussed herein (some illustrated by processes) may be implemented by at least one of hardware, software, firmware, middleware, microcode, or hardware description languages. When implemented by software, firmware, middleware or microcode, the example embodiments of the present disclosure may be implemented using application software/programs that may be stored in a machine or computer readable medium (such as a storage medium). One or more processors may perform the necessary tasks.

Specific structural and functional details disclosed herein are merely representative and for describing example embodiments of the present disclosure. However, the present disclosure may be embodied in many alternate forms, and it should not be interpreted as being limited to the example embodiments set forth herein.

Although the terms "first," "second," etc. are used herein to describe individual units, these units are not limited to these terms. These terms are only used to distinguish one element from another element. For example, without departing from the scope of the exemplary example embodiment, a first element may be termed a second element, and similarly, a second element could be termed a first element. As used herein the term "and/or" includes any one or more of the associated listed items and all combinations thereof.

When an element is referred to as being "connected" or "coupled" to another element, the element may be directly connected or coupled to the other element, or there may be an intermediate unit. On the other hand, when an element is referred to as being "directly connected" or "directly coupled" to another element, there are no intervening elements present. Other terms used to describe the relationship among units should be interpreted in a similar manner. An example of these terms includes "between . . . is" compared to " . . . located directly between", " . . . with the adjacent" compared to "and . . . directly adjacent," etc.

The terms used herein are for describing particular example embodiments only and are not intended to limit example embodiments to an exemplary example embodiment. Unless the context clearly dictates otherwise, the singular forms as used herein, "a," "an" are intended to include the plural. It should also be understood that the terms "comprising" and/or "including" define existence of the described features, integers, steps, operations, elements, and/or components, and may not preclude the presence or addition of one or more other features, integers, steps, operations, elements, components, and/or combinations thereof.

It should also be noted that, in some alternative implementations, functions/acts noted may occur differently from the order indicated in the figures. For example, depending upon the functionality/acts involved, consequential two figures may, in fact, be executed substantially concurrently or may sometimes be executed in the reverse order.

First, technical terms in the example embodiments of the present disclosure are described below.

Speech recognition converts the lexical content of human voices in a computer-readable input, such as a key, or a binary coded character sequence.

Cluster analysis may include multiple patterns. Usually, a pattern refers to a vector of measurement or a point in a multidimensional space. Cluster analysis is performed based on similarity, and patterns in a cluster have more similarity than those in other clusters.

Interpolation refers to a method that uses function values of a function f(x) at several points of a certain space to make a certain appropriate function. The method further uses values of the certain function at other points of the certain space as an approximation of function f(x). If this certain function is a polynomial, it is called polynomial interpolation.

Speaker adaptation refers to using voice data of a certain target speakers, namely using adaptive data modeling to maximize the accuracy of an acoustic model of the target speaker.

The term "i-vector," in the speaker adaptation, refers to a vector associated with each speaker and is used to distinguish the speaker from other speakers during conversations.

Below in conjunction with the accompanying drawings of the implementations of the present disclosure are described in detail.

FIG. 1 is a flowchart illustrating an example method of speech recognition in accordance with example embodiments of the present disclosure. The method may include the following operations performed by a computing device.

At S102, the computing device may cluster feature vectors of training data to obtain clustered feature vectors of training data.

At S104, the computing device may perform interpolation calculation on feature vectors of data to be recognized using the clustered feature vectors of training data.

At S106, the computing device may input the feature vectors of data to be recognized after the interpolation calculation into a speech recognition model to adjust the speech recognition model adaptively.

During the training stage, the computing device may focus on clustering feature vectors of training data. During a recognition stage, the computing device may perform interpolation calculation on feature vectors of data to be recognized using the clustered feature vectors of training data.

With respect to the conventional speech recognition techniques and particularly to adaptive speech recognition techniques, the example embodiments of the present disclosure, during the training stage, cluster the feature vectors of the training data and reduce the number of feature vectors of the training data to improve accuracy, Further, when the clustered feature vectors of training data are used to establish models, vector dimensions are reduced. Thus, the complexity of the models is reduced. Further, during a recognition stage, the example embodiments of the present disclosure perform interpolation calculation on feature vectors of data to be recognized using the clustered feature vectors of training data. Because the amount of training data is relatively large, the accuracy is high. Accordingly, the example embodiments of the present disclosure are particularly suitable for speech recognition of a small amount of data to be recognized (e.g., short voice clips provided by users). By compensating the data to be recognized using the training data that is relatively more accurate, more accurate results of speech recognition may be obtained. Further, efficiency may be improved during the recognition stage because the complexity of the models is reduced.

Cluster analysis may include multiple patterns. Usually, a pattern refers to a vector of measurement or a point in a multidimensional space. Cluster analysis is performed based on similarity, and patterns in a cluster have more similarity than those in other clusters. Clustering algorithms can be divided into a division method, a hierarchy method, a density algorithm, a graph theory clustering method, meshing algorithm, and the model algorithm. Specific algorithms include, for example, K-MEANS, K-MEDOIDS, Clara, Clarans etc.

The interpolation calculation also refers to interpolation or the difference method. The implementations may perform interpolation calculation on feature vectors of data to be recognized using the clustered feature vectors of training data. Accordingly, based on clustered feature vectors, the computing device may adopt an approximate solution for feature vectors of data to be recognized.

A speech recognition acoustic model is an important technique to improve the accuracy of speech recognition. The model may include speaker adaptation, dialect (accent) adaptation, noise adaptation, scene adaptation, etc. The speech recognition acoustic model has important applications in personalized speech recognition and other fields. The speech recognition acoustic model usually uses adaptive data to modify the original acoustic model to improve the performance to a certain degree. When the adaptive data is limited, adaptive effects are not obvious. The present disclosure provides a method based on clustering and adaptive interpolation to achieve rapid and efficient adaptation of acoustic models.

The example embodiments of the present disclosure provide techniques for speech recognition, which may be used for whole speech recognition and other scenarios such as speaker adaptation, dialect (accent) adaptation, noise adaptation, scene adaptation, etc.

For example, for the whole speech recognition, feature vectors include feature vectors obtained after the whole acoustic processing of the voice, noise, scene impact, and dialect impact. The data generally refers to speech feature data. For adaptive speaker recognition, the feature vectors refer to voiceprint feature vectors. The voiceprint feature vectors are speech feature data obtained by considering a corresponding speaker. For dialect (accents) adaptive recognition, the feature vectors refer to dialect feature vectors. For noise adaptive recognition, the features vectors refer to noise feature vectors in various levels. For scenario adaptive recognition, the features vectors refer to scenario feature vectors.

During the training stage, example embodiments are related to clustering of feature vectors. During a recognition stage, example embodiments are related to interpolation calculation on feature vectors of data to be recognized using the clustered feature vectors of training data. These example embodiments are mainly described in the present disclosure.

Examples of speech recognition techniques are provided for speaker adaption in accordance with the present disclosure.

The speaker adaption uses voice data of a certain target speakers, namely using adaptive data modeling to maximize the accuracy of an acoustic model of the target speaker. The speaker adaption converts speech features related to the speaker to speech features not related to the speaker or converts speech features not related to the speaker to speech features related to the speaker to obtain better recognition results.

The term "i-vector" refers to a vector associated with each speaker and used to distinguish the speaker from other speakers during conversations. Usually, the speaker and the channel are two independent modeling spaces: a speaker space and a channel space. The speaker space (Eigenvoice) is represented by a matrix V of an intrinsic sound, and the channel space (Eigenchannel) is represented by a matrix U of an intrinsic channel. Modeling of two spaces can help effectively determine speakers. However, techniques of JFA may not strictly distinguish between the speaker space and the channel space in a piece of speech data. For this feature, total factor analysis techniques have been proposed and use only a single space called a total spatial variation to represent the united speaker and information channel. Variation factors are defined by the total variance matrix, which includes feature vectors corresponding to the maximum eigenvalue eigenvectors in total variation covariance matrix. In the techniques related to variation factors, effects of the speaker and channel spaces in GMM super vector space are not distinguished. Suppose a given period of voice data, GMM mean value of super-vectors of total variation space including the speaker space and the channel space is represented by the following equation:

$$M=m+Tw,$$

wherein m is a mean super vector of UBM and used to represent information not related to the speaker space and the channel space. T is a CF×R dimension Low-order total change matrix, C is the number of Gaussian of GMM, F is dimensions of acoustic features, R is the number of feature vectors included in the total variability matrix, and Vector w is the vector of total variability factors, which follows the standard normal distribution N (0, I). In these instances, each element represents total one-dimensional variation factors; vector w is an identity vector, (i.e., i-Vector).

The computing device may combine speech feature data and voiceprint feature vectors extracted from the corresponding speaker to be input of feature training DNN. During speech recognition, the feature vectors of data to be recognized and the voiceprint feature vectors of the corresponding speaker may be input to DNN for decoding recognition.

In the conventional techniques, a large amount of training date is required to obtain voiceprint feature vectors of a speaker having good performance for speaker adaption. When the training data is limited, estimated voiceprint feature vectors may not effectively improve speech recognition. This results in two drawbacks: 1. when the voiceprint feature vectors are not accurately estimated (e.g., the training data including no information of the speaker or the time period of voice data is too short), the adaptive training may not be performed accurately using the data; 2. the amount of data for estimating voiceprint feature vectors in online speech recognition is too small, and significant results may not be achieved for speaker adaption.

To solve the above drawbacks, the example embodiments of the present disclosure provide a method of fast and effective speaker adaption based on clustering and interpolation of speakers.

Figure 2:
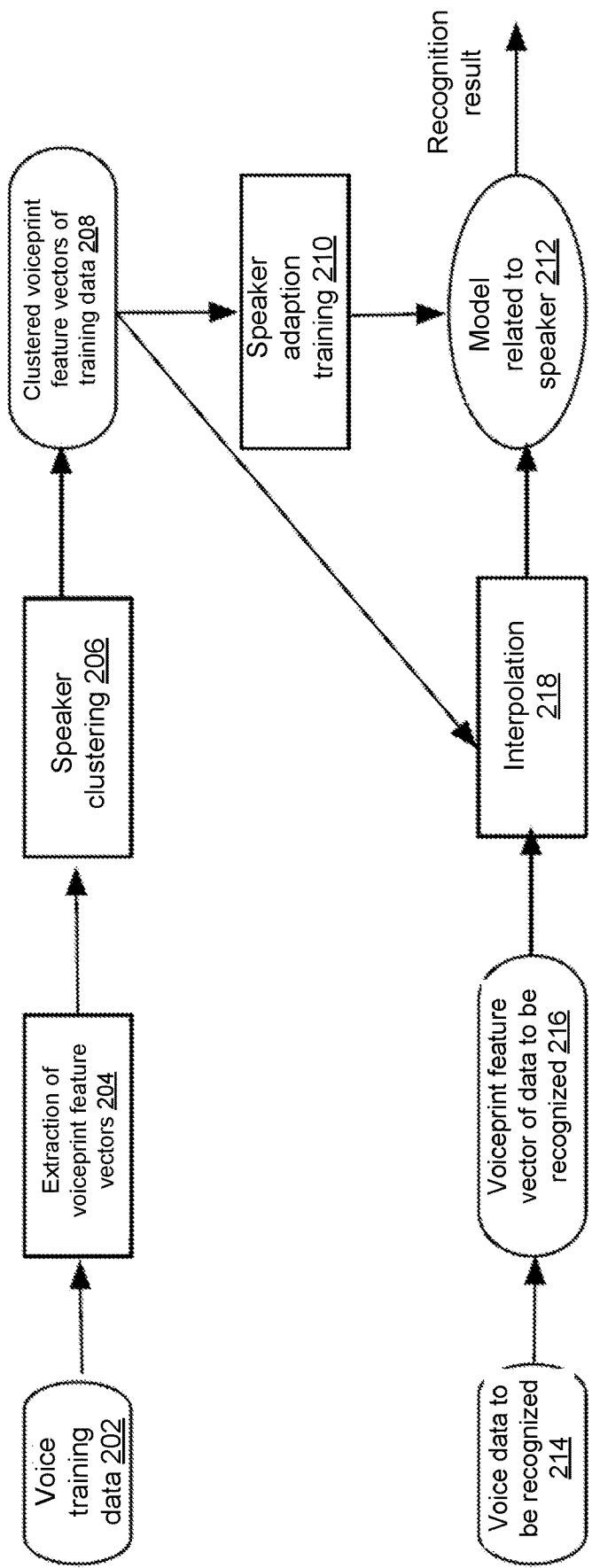
FIG. 2 is a schematic diagram illustrating an adaptive system for speaker adaptation in accordance with example embodiments of the present disclosure.

FIG. 2 is a schematic diagram illustrating an adaptive system for speaker adaptation in accordance with example embodiments of the present disclosure. The system is divided into a training state and a recognition stage (i.e., a testing stage). Examples of speech recognition techniques are provided for each aspect of speaker adaption.

(1) First, voiceprint information is extracted from voice training data 202, and voiceprint feature vectors 204 include but are not limited to i-vectors, speaker codes, etc.

(2) voiceprint feature vectors extracted in the above step are clustered in an unsupervised manner, and clustering methods include but not limited to k-means, hierarchical clustering, etc. The voiceprint feature vectors belonging to the same cluster are considered from a same "speaker," and have speaker clustering 206.

(3) The voiceprint feature vectors belonging to a cluster may be weighted and averaged to obtain voiceprint feature vectors of the "speaker." Voiceprint feature vectors of training data are clustered 208.

(4) The voiceprint features vectors obtained in the previous step are used for adaptive training 210 of a speech recognition acoustic model to obtain the model related to the speaker 212.

By the four operations described above, the training is completed.

The following is a test or recognition stage.

(5) during testing or recognition stage, from the voice data to be recognized 214, feature vectors of voice data to be recognized ($s_{test}$) 216 may be extracted, and cosine distances ($s_{train,i}$) between the feature vectors of data to be recognized and the voiceprint feature vectors may be calculated, The voiceprint feature vectors of N training clusters having maximum cosine distances with respect to the voiceprint feature vectors ($s_{train,i}$) may be selected for interpolation 218 using $s_{test}$ to obtain new feature vectors of data to be recognized ($\bar{s}_{test}$) for speech recognition. The interpolation is performed using the following formula:

$$\bar{s}_{test} = \frac{\alpha s_{test} + (1-\alpha) \sum_{i=1}^{N} \beta_i s_{train,i}}{\alpha + (1-\alpha) \sum_{i=1}^{N} \beta_i},$$

wherein $\alpha$ is an adjustable parameter, which is used for adjusting interpolation based on the amount of data to be recognized, $\alpha=1$ represents a condition that the feature vectors of data to be recognized are fully adopted, and $\alpha=0$ represents a condition that the voiceprint feature vectors interpolated using the training data are fully adopted.

Accordingly, during the interpolation calculation, the computing device may configure adjustable parameters of interpolation and configure a degree of influence of the clustered feature vectors of training data to the feature vectors of data to be recognized by adjusting values of the adjustable parameters.

(6) the voiceprint feature vectors of new data to be recognized (($\bar{s}_{test}$) may be input to a model related to the speaker to perform adaptive adjustment of the model.

FIG. 2 illustrates example embodiments of speaker adaption. In fact, the example embodiments of the present disclosure may include speaker adaptation, dialect adaptation, noise adaptation, scene adaptation, etc.

For example, for speaker adaptive recognition, a certain type of dialect data may be obtained by data training to obtain dialect feature vectors during the training stage. Further, after clustering, clustered dialect feature vectors may be obtained accordingly. During a recognition stage, the example embodiments of the present disclosure perform interpolation calculation on dialect feature vectors of data to be recognized using the clustered dialect feature vectors of training data and input the feature vectors after the interpolation calculation into a speech recognition model to perform adaptive adjustment of models.

Similarly, for noise adaptive recognition, during the training stage, different levels of noise may be segmented (classification), which is a clustering process. During the recognition stage, the computing device may perform interpolation calculation on noise feature vectors of data to be recognized using the clustered noise feature vectors of training data and input the feature vectors after the interpolation calculation into a speech recognition model to perform adaptive adjustment of models.

For scene adaptive recognition, during the training stage, users are generally required to input or submit information of the scene to preset reference template for the information. Individual pieces of the information may be clustered to obtain clustered scene information feature vectors. During a recognition stage, the example embodiments of the present disclosure perform interpolation calculation on scene information feature vectors of data to be recognized using the clustered scene information feature vectors of training data and input the feature vectors after the interpolation calculation into a speech recognition model to perform adaptive adjustment of models.

In implementations, for the whole speech recognition, and other scenarios such as speaker adaptation, dialect adaptation, noise adaptation, scene adaptation, etc. may be considered. In some implementations, during the training stage, features of inputted training data may include voiceprint features, dialect features, noise features, and scene features. When generating feature vectors using data, feature vectors corresponding to each feature may be generated and clustered, respectively, to obtain clustered feature vectors. During a recognition stage, the computing device may perform interpolation calculation on corresponding feature vectors of data to be recognized using each type of the clustered feature vectors of training data and input each type of the feature vectors after the interpolation calculation into the corresponding speech recognition model for matching to perform adaptive adjustment of models.

Figure 3:
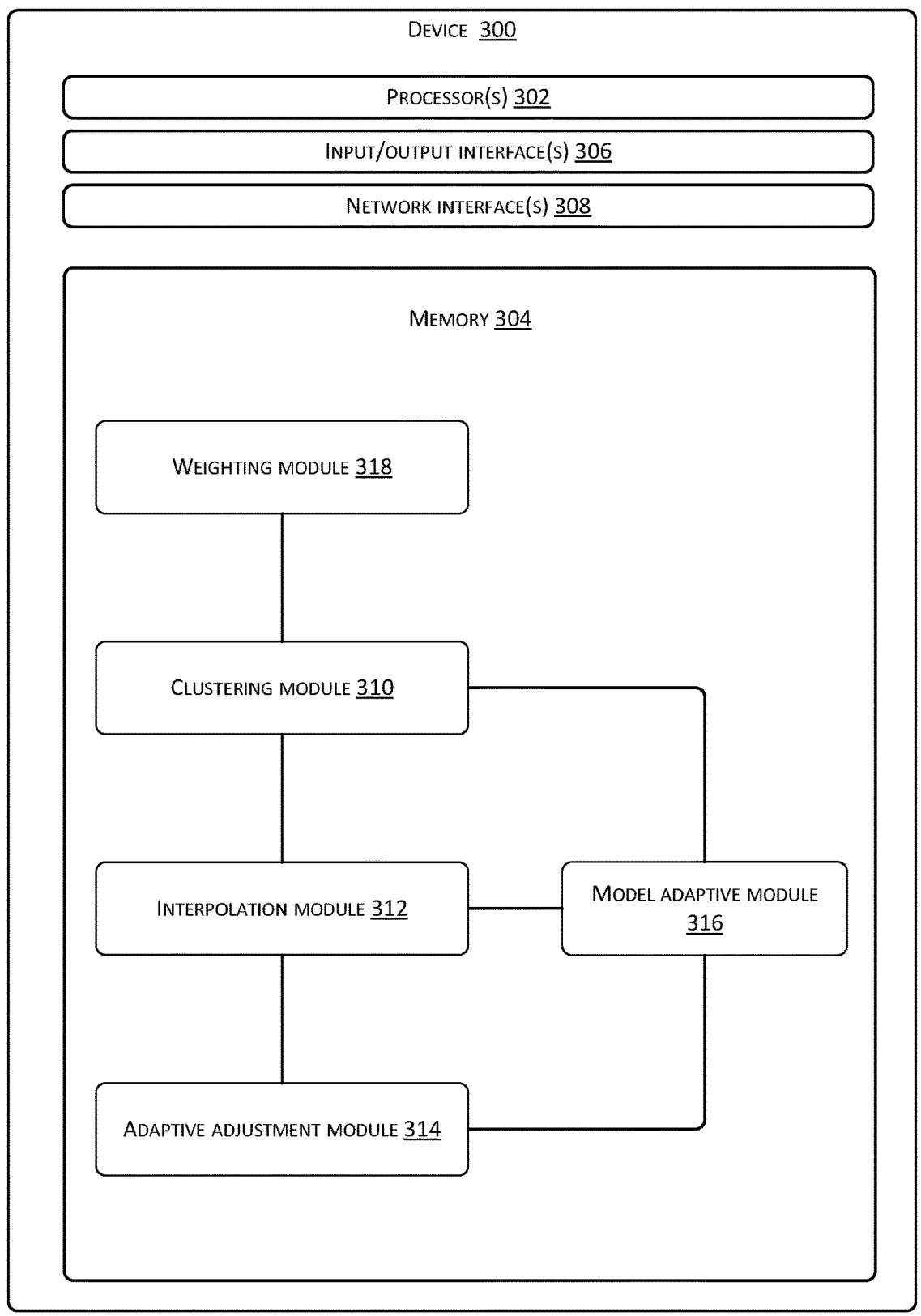
FIG. 3 is a schematic diagram illustrating a device for speech recognition in accordance with example embodiments of the present disclosure.

Example embodiments of the present disclosure relate to a device for adaptive speech recognition corresponding to the method described above. As illustrated in FIG. 3, a device 300 includes one or more processor(s) 302 or data processing unit(s) and memory 304. The device 300 may further include one or more input/output interface(s) 306, and network interface(s) 308. The memory 304 is an example of computer readable media.

The computer readable media include volatile and non-volatile, removable and non-removable media, and can use any method or technology to store information. The information may be a computer readable instruction, a data structure, and a module of a program or other data. Examples of storage media of a computer include, but are not limited to, a phase change memory (PRAM), a static random access memory (SRAM), a dynamic random access memory (DRAM), other types of RAMs, an ROM, an electrically erasable programmable read-only memory (EEPROM), a flash memory or other memory technologies, a compact disk read-only memory (CD-ROM), a digital versatile disc (DVD) or other optical storage, a cassette tape, a tape disk storage or other magnetic storage devices, or any other non-transmission media, which can be that storing information accessible to a computation device. According to the definition herein, the computer readable media does not include transitory computer readable media (transitory media), for example, a modulated data signal and a carrier.

The memory 304 may store therein a plurality of modules or units including: a clustering module 310 configured to cluster feature vectors of training data, to obtain clustered feature vectors of training data; an interpolation module 312 configured to perform interpolation calculation on feature vectors of data to be recognized using the clustered feature vectors of training data; and an adaptive adjustment module 314 configured to input the feature vectors of data to be recognized after the interpolation calculation into a speech recognition model to adjust the speech recognition model adaptively.

In implementations, the device 300 may further include a model adaptive module 316, stored on memory 304, configured to perform adaptive training on the speech recognition model using the clustered feature vectors of training data to obtain the speech recognition model.

In implementations, the device may further include a weighting module 318 configured to perform weight average processing on clustered feature vectors of training data that belong to a cluster.

In implementations, the interpolation module 312 may calculate a cosine distance between the feature vectors of data to be recognized and the clustered feature vectors of training data and perform interpolation calculation on feature vectors of data to be recognized using a predetermined number of clustered feature vectors of training data of which cosine distances are greater than a value.

In implementations, the interpolation module 312 may be configured to configure adjustable parameters of interpolation and configure a degree of influence of the clustered feature vectors of training data to the feature vectors of data to be recognized by adjusting values of the adjustable parameters.

In implementations, the feature vectors of training data include at least one of a voiceprint feature vector, a noise feature vector, a dialect feature vector, or a scene information feature vector.

It should be noted that the present disclosure may be entirely implemented by hardware, software, or a combination of hardware and software. For example, the present disclosure may be implemented using a specific integrated circuit (ASIC), a general-purpose computer or any other similar hardware. In some implementations, application software/program may be implemented by a processor to perform the steps or functions described above. Similarly, the application software/programs (including associated data structures) may be stored in computer readable media, For example, RAM memory, magnetic or optical drive or floppy disk and similar devices. In addition, some steps or features of this present disclosure may be implemented in hardware including, for example, processors and circuits performing certain steps and/or functions.

In addition, parts of this present disclosure may be implemented as a computer program product, e.g., computer program instructions, when executed, by operating the computer, may call or provision methods or technical solutions of the present disclosure. The called program instructions according to the present disclosure may be stored in fixed or removable recording medium, and/or be transmitted via the data stream, radio or other signaling carriers, and/or be stored in working memory of a computing device that runs the computer program instructions. Here, an implementation of the present disclosure includes an apparatus, which includes a memory storing computer program instructions and a processor for executing the program instructions, and, when executed, methods and/or technical solutions of some implementations may be performed by the apparatus.

Those skilled in the art should understand that the implementations of the present disclosure are not limited to those detailed example implementations, without conflict, the present disclosure may be achieved by other implementations. Accordingly, the above-described descriptions are merely illustrative, and non-limiting, the scope of the invention by the appended claims rather than by the foregoing description, Therefore, all changes intended to fall within the scope of claims and equivalents are within the scope of the present application. Any references to FIGS. in claims should not be seen as the right to limit the claims. In addition, apparently "comprising" does not exclude other elements or steps, and singular does not exclude a plurality. A plurality of units or means recited in the claims refer to multiple units/devices or multiple units/devices including hardware and software. The first and the second are used to indicate names rather than any particular order.

What is claimed is:

1. A method comprising:
    clustering, by one or more processors of a computing device, feature vectors of training data to obtain clustered feature vectors of training data corresponding to a speaker;
    performing interpolation calculation on feature vectors of test data to be recognized using the clustered feature vectors of training data corresponding to the speaker; and
    inputting the feature vectors of test data to be recognized having undertaken interpolation calculation into a speech recognition model to adaptively adjust the speech recognition model, the speech recognition model being trained using the clustered feature vectors of training data corresponding to the speaker;
    wherein the performing interpolation calculation on the feature vectors of test data to be recognized using the clustered feature vectors of training data comprises:
    calculating a cosine distance between the feature vectors of test data to be recognized and the clustered feature vectors of training data; and
    performing interpolation calculation on the feature vectors of test data to be recognized using a predetermined number of clustered feature vectors of training data of which cosine distances are greater than a preset value.

2. The method of claim 1, further comprising:
    performing adaptive training of the speech recognition model using the clustered feature vectors of training data to obtain the speech recognition model after obtaining the clustered feature vectors of training data.

3. The method of claim 1, further comprising:
    after clustering the feature vectors of training data and before obtaining the clustered feature vectors of training data,
    performing weight average processing on clustered feature vectors of training data that belong to a cluster.

4. The method of claim 1, further comprising:
    configuring adjustable parameters of interpolation during the interpolation calculation; and configuring a degree of influence of the clustered feature vectors of training data on the feature vectors of test data to be recognized by adjusting values of the adjustable parameters.

5. The method of claim 1, wherein the feature vectors of training data include a voiceprint feature vector.

6. The method of claim 1, wherein the feature vectors of training data include a noise feature vector.

7. The method of claim 1, wherein the feature vectors of training data include a dialect feature vector.

8. The method of claim 1, wherein the feature vectors of training data include a scene information feature vector.

9. A device comprising:
one or more processors;
memory;
a clustering module stored in the memory and executable by the one or more processors to cluster feature vectors of training data to obtain clustered feature vectors of training data corresponding to a speaker;
an interpolation module stored in the memory and executable by the one or more processors to perform interpolation calculation on feature vectors of test data to be recognized using the clustered feature vectors of training data corresponding to the speaker; and
an adaptive adjustment module stored in the memory and executable by the one or more processors to input the feature vectors of test data to be recognized having undertaken interpolation calculation into a speech recognition model to adaptively adjust the speech recognition model, the speech recognition model being trained using the clustered feature vectors of training data corresponding to the speaker;
wherein the interpolation module is executable by the one or more processors to further calculate a cosine distance between the feature vectors of test data to be recognized and the clustered feature vectors of training data and to perform interpolation calculation on feature vectors of data to be recognized using a predetermined number of clustered feature vectors of training data of which cosine distances are greater than a value.

10. The device of claim 9, wherein the device further comprises a model adaptive module stored in the memory and executable by the one or more processors to perform adaptive training of the speech recognition model using the clustered feature vectors of training data to obtain the speech recognition model.

11. The device of claim 9, wherein the device further comprises a weighting module stored in the memory and executable by the one or more processors to perform weight average processing on clustered feature vectors of training data that belong to a cluster.

12. The device of claim 9, wherein the interpolation module is executable by the one or more processors to configure adjustable parameters of interpolation and to configure a degree of influence of the clustered feature vectors of training data to the feature vectors of test data to be recognized by adjusting values of the adjustable parameters.

13. The device of claim 9, wherein the feature vectors of training data include at least one of a voiceprint feature vector, a noise feature vector, a dialect feature vector, or a scene information feature vector.

14. One or more memories stored thereon computer-readable instructions that, when executed by one or more processors, cause the one or more processors to perform acts comprising:

clustering, by one or more processors of a computing device, feature vectors of training data to obtain clustered feature vectors of training data corresponding to a speaker;
performing interpolation calculation on feature vectors of test data to be recognized using the clustered feature vectors of training data corresponding to the speaker; and
inputting the feature vectors of test data to be recognized having undertaken interpolation calculation into a speech recognition model to adaptively adjust the speech recognition model, the speech recognition model being trained using the clustered feature vectors of training data corresponding to the speaker;
wherein the performing interpolation calculation on the feature vectors of test data to be recognized using the clustered feature vectors of training data comprises:
calculating a cosine distance between the feature vectors of test data to be recognized and the clustered feature vectors of training data; and
performing interpolation calculation on the feature vectors of test data to be recognized using a predetermined number of clustered feature vectors of training data of which cosine distances are greater than a preset value.

15. The one or more memories of claim 14, wherein the acts further comprise:
performing adaptive training of the speech recognition model using the clustered feature vectors of training data to obtain the speech recognition model after obtaining the clustered feature vectors of training data.

16. The one or more memories of claim 14, wherein the acts further comprise:
after clustering the feature vectors of training data and before obtaining the clustered feature vectors of training data,
performing weight average processing on clustered feature vectors of training data that belong to a cluster.

17. The one or more memories of claim 14, wherein the acts further comprise:
configuring adjustable parameters of interpolation during the interpolation calculation; and
configuring a degree of influence of the clustered feature vectors of training data on the feature vectors of test data to be recognized by adjusting values of the adjustable parameters.

18. A method comprising:
adjusting a speech recognition model using training data by:
clustering, by one or more processors of a computing device, feature vectors of the training data to obtain clustered feature vectors of training data corresponding to a speaker;
performing interpolation calculation on feature vectors of test data to be recognized using the clustered feature vectors of training data corresponding to the speaker; and
inputting the feature vectors of test data to be recognized having undertaken interpolation calculation into a speech recognition model to adaptively adjust the speech recognition model, the speech recognition model being trained using the clustered feature vectors of training data corresponding to the speaker;
wherein the performing interpolation calculation on the feature vectors of test data to be recognized using the clustered feature vectors of training data comprises:

calculating a cosine distance between the feature vectors of test data to be recognized and the clustered feature vectors of training data; and performing interpolation calculation on the feature vectors of test data to be recognized using a predetermined number of clustered feature vectors of training data of which cosine distances are greater than a preset value; and performing speech recognition on the test data to be recognized by applying the adjusted speech recognition model to the test data to be recognized.

19. The method of claim 18, wherein speech recognition performed on the test data to be recognized is one of whole speech recognition, speaker adaptation, dialect (accent) adaptation, noise adaptation, or scene adaptation.

20. The method of claim 18, wherein the amount of training data is relatively large compared to the amount of test data to be recognized.

* * * * *